United States Patent
Chang

(10) Patent No.: US 9,161,100 B2
(45) Date of Patent: Oct. 13, 2015

(54) CABLE TIDYING DEVICE

(71) Applicant: Chun-Yuan Chang, New Taipei (TW)

(72) Inventor: Chun-Yuan Chang, New Taipei (TW)

(73) Assignee: HON HAI PECISION INDUSTRY CO., LTD., New Taipei (TW)

( * ) Notice: Subject to any disclaimer, the term of this patent is extended or adjusted under 35 U.S.C. 154(b) by 256 days.

(21) Appl. No.: 13/656,733

(22) Filed: Oct. 21, 2012

(65) Prior Publication Data
US 2013/0105616 A1 May 2, 2013

(30) Foreign Application Priority Data
Oct. 28, 2011 (TW) .................................. 100139379

(51) Int. Cl.
*B65H 75/38* (2006.01)
*H04Q 1/06* (2006.01)
*H01R 13/72* (2006.01)

(52) U.S. Cl.
CPC . *H04Q 1/06* (2013.01); *H01R 13/72* (2013.01)

(58) Field of Classification Search
CPC .... H02G 11/02; B65H 2701/34; B65H 75/38; G02B 6/4457; B60P 7/083
USPC .................. 242/388, 388.1, 388.5, 388.6, 389
See application file for complete search history.

(56) References Cited

U.S. PATENT DOCUMENTS

| | | | | |
|---|---|---|---|---|
| 329,191 A * | 10/1885 | McMurtrie | ...................... | 206/53 |
| 548,915 A * | 10/1895 | Hartz | ............................. | 254/401 |
| 1,228,501 A * | 6/1917 | Twite | ............................. | 242/388 |
| 1,568,743 A * | 1/1926 | Kitto | ............................. | 242/388.5 |
| 1,605,030 A * | 11/1926 | Hurley | .............................. | 225/76 |
| 1,977,187 A * | 10/1934 | Katz | ................................ | 225/76 |
| 2,351,379 A * | 6/1944 | Wehringer | ...................... | 242/388 |
| 2,572,289 A * | 10/1951 | Truslow et al. | ............... | 493/406 |
| 2,638,346 A * | 5/1953 | Stapleton | ...................... | 473/493 |
| 3,834,674 A * | 9/1974 | Jackson | ......................... | 254/394 |
| 3,853,304 A * | 12/1974 | Jackson | ......................... | 254/394 |
| 4,095,871 A * | 6/1978 | Holte | ............................. | 439/501 |
| 4,343,211 A * | 8/1982 | Volle | ............................... | 83/177 |
| 4,592,739 A * | 6/1986 | Ogawa | .......................... | 493/415 |
| 4,869,344 A * | 9/1989 | Peterson | ....................... | 182/129 |
| 5,020,151 A * | 5/1991 | Sampei et al. | ................ | 455/345 |
| 5,174,515 A * | 12/1992 | Meier | ............................ | 242/388 |
| 5,715,145 A * | 2/1998 | Wong et al. | ................... | 361/796 |

(Continued)

FOREIGN PATENT DOCUMENTS

| | | | | | |
|---|---|---|---|---|---|
| GB | 2348183 A | * | 9/2000 | ............. | H02G 11/02 |
| GB | 2405268 A | * | 2/2005 | ............. | H01R 13/72 |

*Primary Examiner* — Emmanuel M Marcelo
*Assistant Examiner* — Michael Gallion
(74) *Attorney, Agent, or Firm* — Novak Druce Connolly Bove + Quigg LLP

(57) ABSTRACT

A cable tidying device includes a bracket mounted to a cabinet, a bobbin for wrapping cables inserted into the cabinet, and a locating member for locating the bobbin. The bracket includes a positioning plate defining a positioning hole and a first groove surrounding the positioning hole. The bobbin includes a wrapping axis extending through the first groove, and a driving portion extending from the wrapping axis. The locating member includes a spine plate, a fixing portion, and a spring resisting between the fixing portion and the positioning plate. The spine plate includes a main body, a protruding post protruding from the main body, and a plurality of ratchets spaced from each other. The fixing portion is attached to the protruding post. The driving portion engages with a different ratchet to locate the bobbin in a different position of the first groove.

18 Claims, 6 Drawing Sheets

(56) References Cited

U.S. PATENT DOCUMENTS

| | | | |
|---|---|---|---|
| 6,149,096 A * | 11/2000 | Hartley | 242/390.9 |
| 6,231,144 B1 * | 5/2001 | Chen et al. | 312/332.1 |
| 6,398,149 B1 * | 6/2002 | Hines et al. | 242/399 |
| 6,452,108 B1 * | 9/2002 | Major | 174/135 |
| 7,406,242 B1 * | 7/2008 | Braga | 385/135 |
| 7,425,143 B2 * | 9/2008 | Mitsui | 439/164 |
| 7,861,904 B1 * | 1/2011 | Taylor et al. | 225/65 |
| 7,905,233 B2 * | 3/2011 | Hopper | 128/869 |
| 8,003,890 B2 * | 8/2011 | Donowho et al. | 174/100 |
| 8,496,210 B2 * | 7/2013 | Chang et al. | 248/27.3 |
| RE44,758 E * | 2/2014 | Allen et al. | 385/135 |
| 2002/0011547 A1 * | 1/2002 | Gross et al. | 248/351 |
| 2002/0172777 A1 * | 11/2002 | Cronk et al. | 427/421 |
| 2002/0197045 A1 * | 12/2002 | Schmidt et al. | 385/134 |
| 2005/0006323 A1 * | 1/2005 | Abby et al. | 211/26 |
| 2006/0011379 A1 * | 1/2006 | Banar et al. | 174/135 |
| 2006/0172591 A1 | 8/2006 | Huang | 439/501 |
| 2008/0261441 A1 * | 10/2008 | Shih et al. | 439/501 |
| 2011/0043583 A1 * | 2/2011 | Silverbrook et al. | 347/104 |
| 2012/0044626 A1 * | 2/2012 | Haigh | 361/679.33 |
| 2012/0257861 A1 * | 10/2012 | Kang et al. | 385/91 |
| 2013/0194095 A1 * | 8/2013 | Willis et al. | 340/568.1 |

\* cited by examiner

CABLE TIDYING DEVICE

BACKGROUND

1. Technical Field

The present disclosure relates to a cable tidying device.

2. Description of Related Art

An electronic system may comprise a pair of bobbins for wrapping cables on two sides of the electronic system. Different cables extend from different openings of the bobbins. However, without a cable tidying device to adjust length of the cables, it is hard and takes a long time to tidy the long cables of the electronic system.

Therefore, a need exists in the industry to overcome the described limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
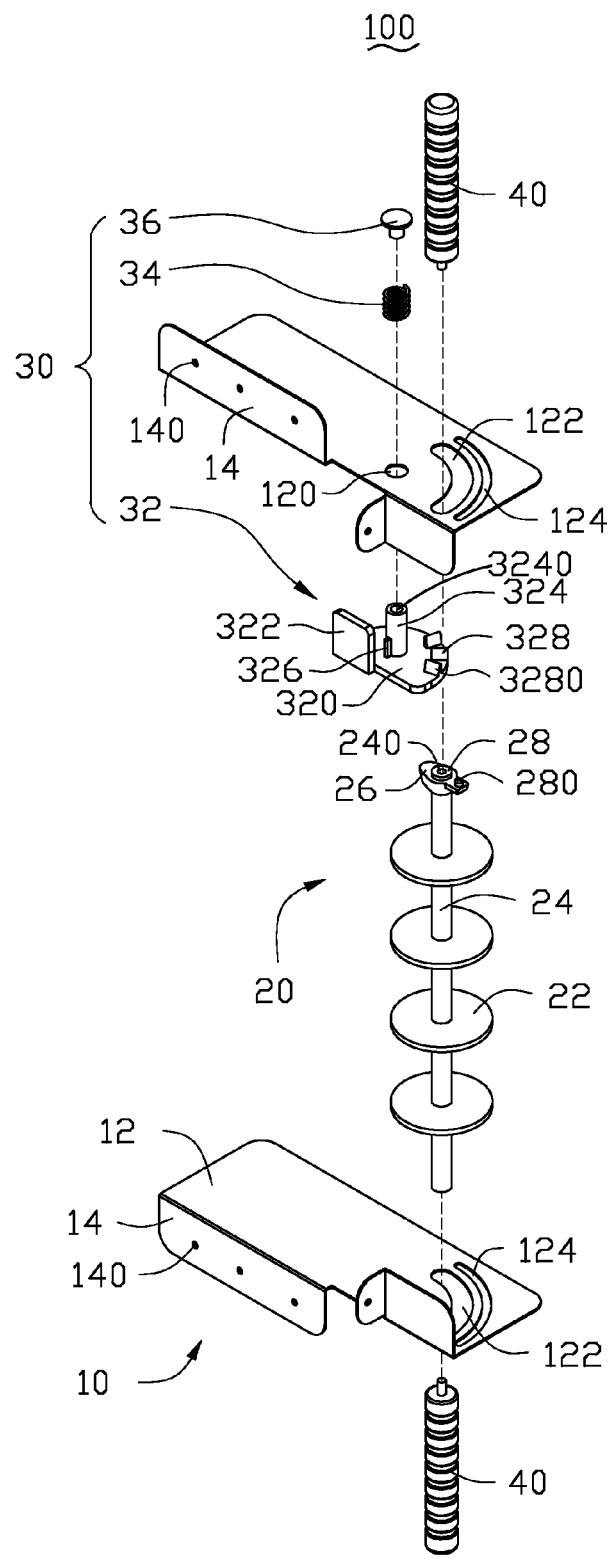
FIG. 1 is a disassembled perspective view of a cable tidying device in accordance with one exemplary embodiment of the disclosure.
Figure 3:
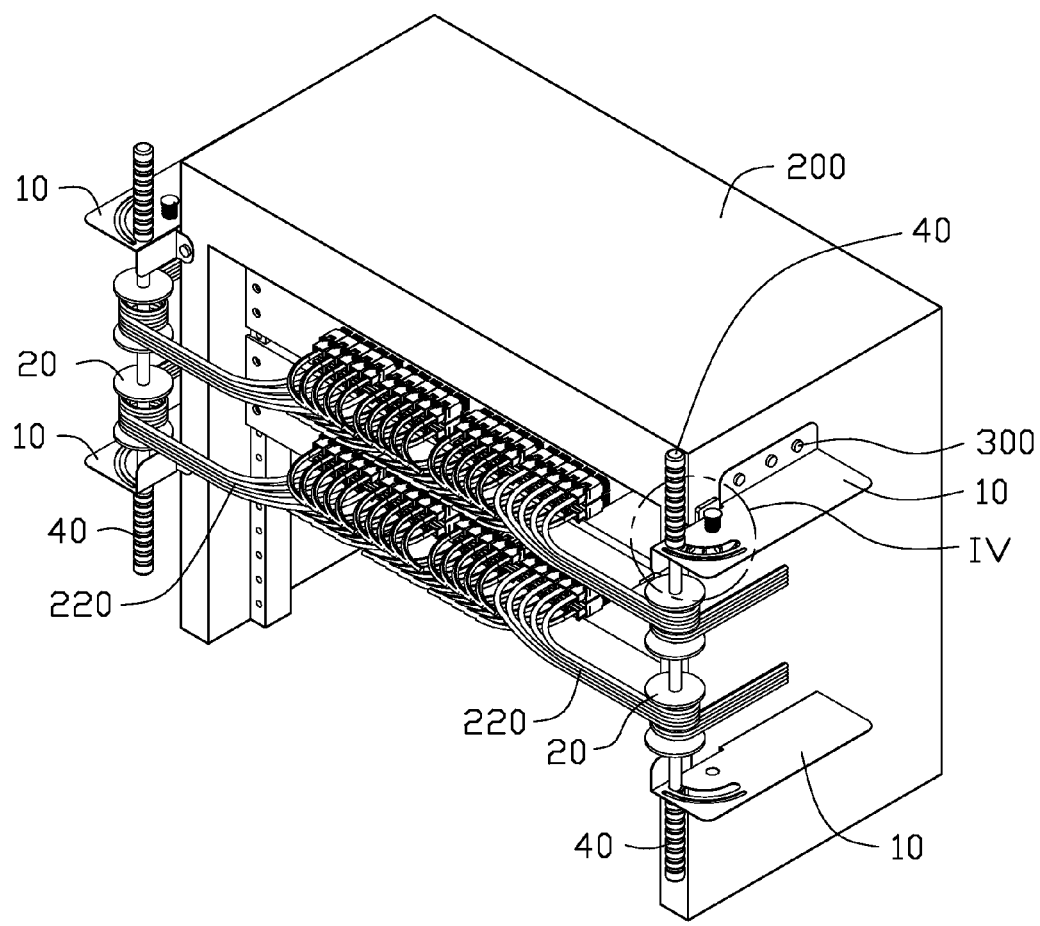
FIG. 3 is a perspective view of the cable tidying device in FIG. 1 mounted in a cabinet, in which the cable tidying device is in a cable collecting state.

In FIG. 1 and FIG. 3, a cable tidying device 100, mounted in a cabinet 200, is used to wrap and tidy cables 220 inserted into the cabinet 200. In the illustrated embodiment, there are two cable tidying devices 100 mounted to two sidewalls of the cabinet 200.

The cable tidying device 100 comprises a pair of brackets 10, a bobbin 20, a locating member 30, and a pair of handles 40.

Each of the pair of brackets 10 comprises a positioning plate 12 and a fixing plate 14 bending and extending from a sidewall of the positioning plate 12. The fixing plate 14 is fixed on a sidewall of the cabinet 200. The positioning plate 12 defines a positioning hole 120, a first groove 122, and a second groove 124. Both the first groove 122 and the second groove 124 are in an arc shape and surround the positioning hole 120. The first groove 122 is homocentric with the second groove 124, and is homocentric with the positioning hole 120. The first groove 122 is configured between the positioning hole 120 and the second groove 124. The first groove 122 and the second groove 124 are used to define a moving path of the bobbin 20.

In the illustrated embodiment, the bracket 10 mounted in upper position of the cabinet 200 is hereinafter named as a upper bracket 10.

The fixing plate 14 defines a plurality of threaded holes 140. A plurality of screws 300 are mounted in the plurality of threaded holes 140 to fix the pair of brackets 10 onto the two sidewalls of the cabinet 200, so as to mount the cable tidying device 100 onto the cabinet 200.

The bobbin 20 for wrapping cables 220 inserted into the cabinet 200 comprises a plurality of turntables 22, a wrapping axis 24, a driving portion 26, and a positioning portion 28.

The turntables 22 divide the wrapping axis 24 into a plurality of concentric wrapping sections to wrap the cables 220. In other embodiments, the wrapping sections are not aligning to wrap the cables 220 in different lengths. The wrapping axis 24 defines a pair of fixing holes 240 positioned on two ends of the wrapping axis 24 to engage with the pair of handles 40.

Figure 4:
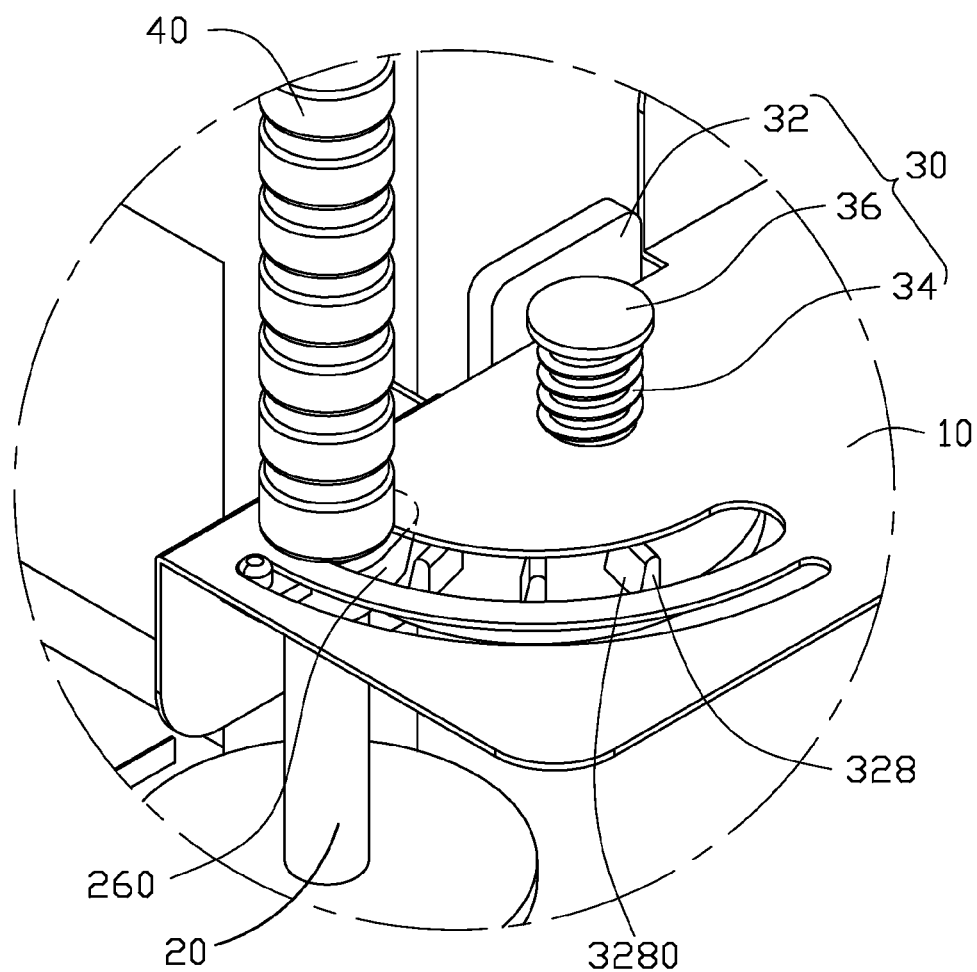
FIG. 4 is an enlarged perspective view taken along IV of FIG. 3.

The driving portion 26 extends from an end side of the wrapping axis 24 to drive the locating member 30. The driving portion 26 is in a cuneate shape and defines a first inclined plane 260 (as shown in FIG. 4). The positioning portion 28 extends from the end side of the wrapping axis 24 to an opposite direction of the driving portion 26, and comprises a positioning pole 280. The positioning pole 280 protrudes from a center of the positioning portion 28 and is received in the second groove 124 of the bracket 10 to locate the bobbin 20.

The locating member 30 is mounted onto the bracket 10 to locate the bobbin 20, and comprises a spine plate 32, a spring 34, and a fixing portion 36. A diameter of the spring 34 is longer than a diameter of the positioning hole 120 of the bracket 10.

The spine plate 32 comprises a main body 320, a stopper portion 322, a protruding post 324, a limited block 326 and a plurality of ratchets 328 spaced from each other. The main body 320 forms an arcuate shape. In the illustrated embodiment, the main body 320 is shaped in three-fourths of a circle. The stopper portion 322 perpendicularly extends from a straight sidewall of the main body 320, and mates with a sidewall of the upper bracket 10 to stop the spine plate 32 rotating. The protruding post 324 is configured in middle of the main body 320 and defines a mounting hole 3240 in a shaft end of the protruding post 324. The limited block 326 is configured on an outside wall of the protruding post 324. The protruding post 324 is positioned higher than the limited block 326. The plurality of ratchets 328 is positioned on the main body 320 and is contiguous with an arc side of the main body 320. The limited block 326 is higher than each of the plurality of ratchets 328. Each of the plurality of ratchets 328 is in a cuneate shape and defines a second inclined plane 3280. The first inclined plane 260 engages with the second inclined plane 3280 to drive the locating member 30 moving in an axis direction.

In other embodiments, the second inclined plane 3280 is configured on two sides of each of the plurality of ratchets 328.

Figure 2:
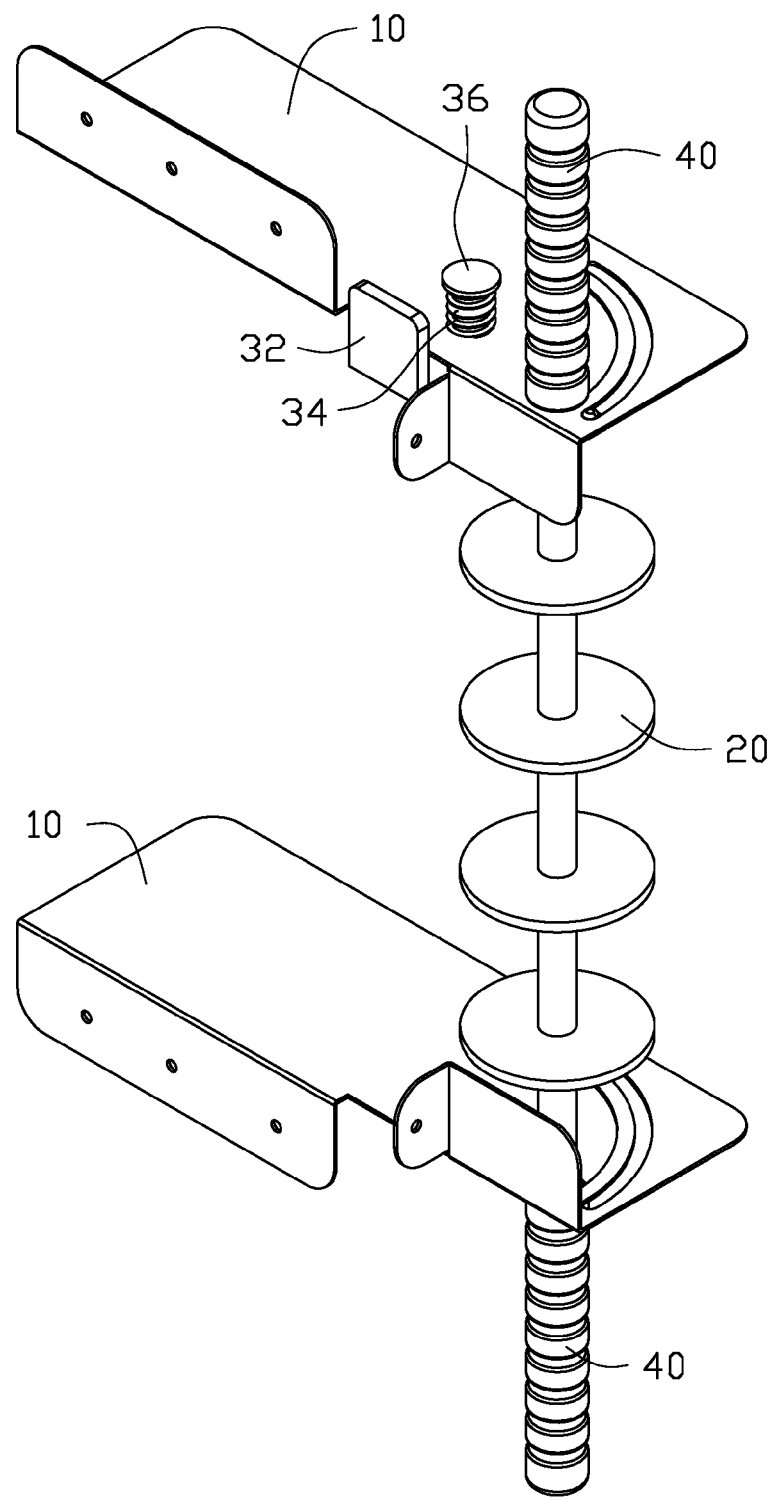
FIG. 2 is a perspective view of the cable tidying device in FIG. 1.

In FIG. 2 and FIG. 3, two ends of the wrapping axis 24 extend through the first grooves 122 of the pair of brackets 10, and the pair of handles 40 is securely mounted in the pair of fixing holes 240 of the wrapping axis 24. The spring 34 is coiled around the protruding post 324 of the spine plate 32, the protruding post 324 passes through the positioning hole 120 of the upper bracket 10, and the fixing portion 36 is securely fixed in the mounting hole 3240 of the protruding post 324. Therefore, the pair of brackets 10, the bobbin 20, the pair of handles 40 and the locating member 30 are assembled together to be the cable tidying device 100. The pair of brackets 10 is mounted onto the two sidewalls of the cabinet 200 by the screws 300, so that the cable tidying device 200 is securely attached to the cabinet 200. In this assembling state, the spring 34 is on an original state and is resisted between the positioning plate 12 of the bracket 10 and the fixing portion 36. The stopper portion 322 of the spine plate 32 is configured between the positioning plate 12 of the bracket 10 and the sidewall of the cabinet 200 to prevent the spine plate 32 rotating.

In FIG. 3 and FIG. 4, the cable tidying device 100 is in a cables 220 collecting state. To collect the cables 220, the first inclined plane 260 of the driving portion 26 engages with the corresponding second inclined plane 3280 of the corresponding ratchet 328 to push the spine plate 32 sliding along the upper bracket 10 by rotating the pair of handles 40. At the same time, the spring 34 is compressed, the driving portion 26 disengages from the corresponding ratchet 328, and the bobbin 20 moves on a first direction along the first groove 122 and the second groove 124 of the bracket 10. After collecting the cables 220, the spring 34 automatically restores to drive the spine plate 32 moving upward relative to the upper bracket 10 until the limited block 326 resists on the positioning plate 12 of the upper bracket 10. The bobbin 20 is settled in different position of the first groove 122 by engaging the first inclined plane 260 of the driving portion 26 with the corresponding second inclined plane 3280 of the corresponding ratchet 328.

In other embodiment, to collect the cables 220, the spring 34 is compressed by pressing the fixing portion 36, the driving portion 26 disengages from the corresponding ratchet 328, and the bobbin 20 moves on the first direction along the first groove 122 and the second groove 124 of the bracket 10.

Figure 5:
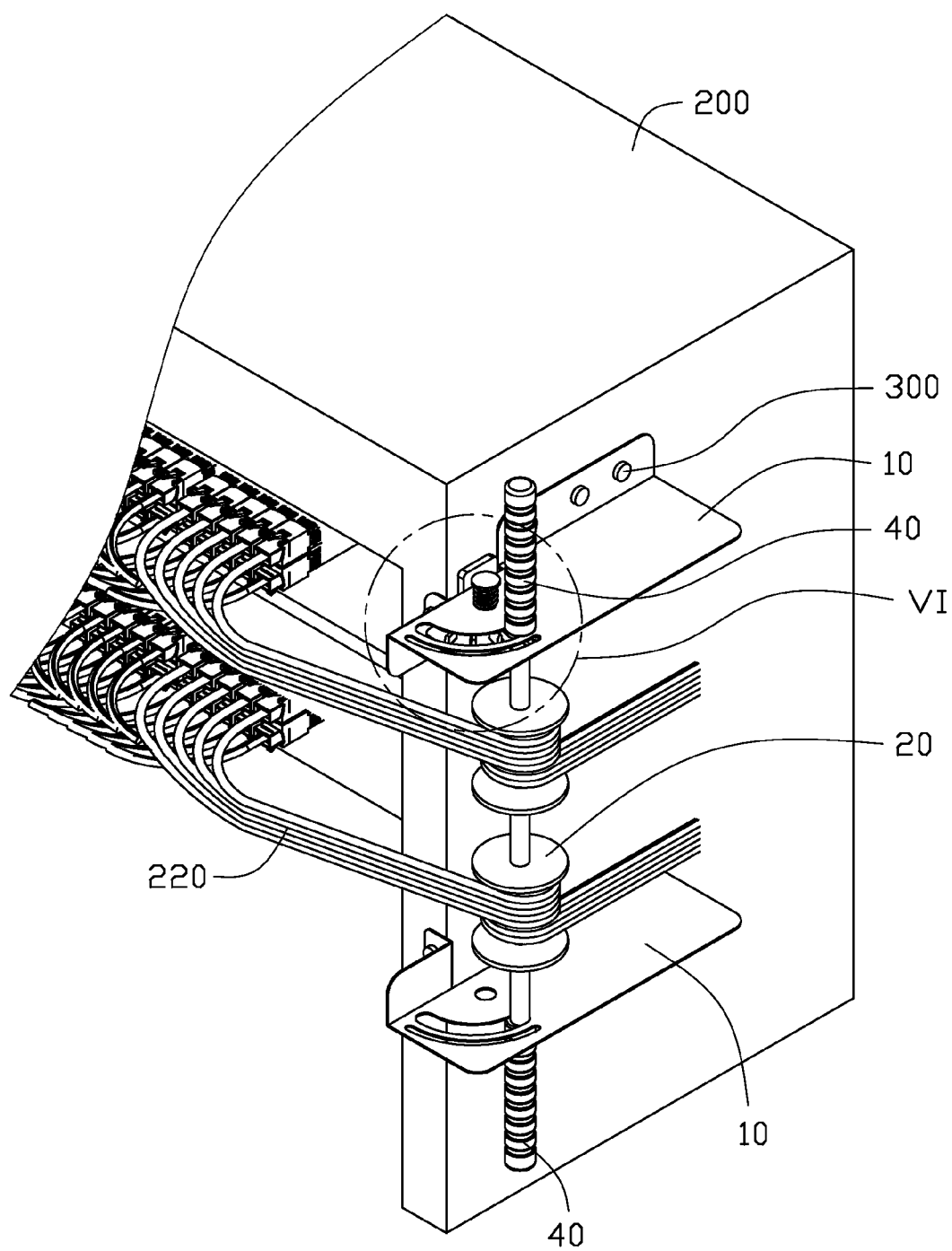
FIG. 5 is a perspective view of the cable tidying device mounted in the cabinet, in which the cable tidying device is in a cables discharging state.
Figure 6:
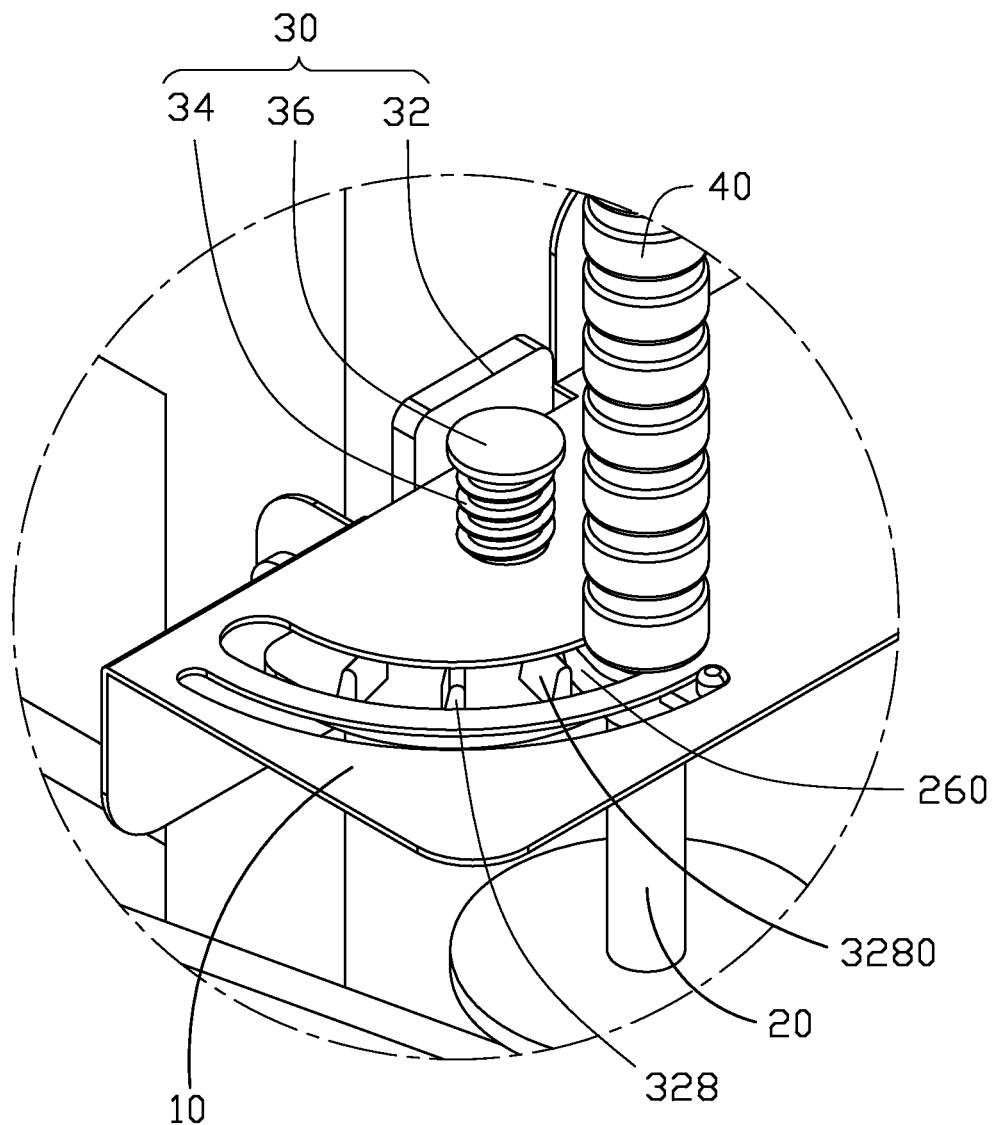
FIG. 6 is an enlarged perspective view taken along VI of FIG. 5.

In FIG. 5 and FIG. 6, the cable tidying device 100 is in a cables 220 discharging state. To discharge the cables 220, the spring 34 is compressed by pressing the fixing portion 36, the driving portion 26 disengages from the corresponding ratchet 328, and the bobbin 20 moves on a second direction along the first groove 122 and the second groove 124 of the bracket 10. After discharging the cables 220, the spine plate 32 is loosen and the spring 34 automatically restores to drive the spine plate 32 moving upward relative to the upper bracket 10 until the limited block 326 resists on the positioning plate 12 of the upper bracket 10. The driving portion 26 resists on the corresponding ratchet 328 to locate the bobbin 20.

In other embodiments, to discharge the cables 220, the first inclined plane 260 of the driving portion 26 engages with the corresponding second inclined plane 3280 of the corresponding ratchet 328 to push the spine plate 32 sliding downward along the upper bracket 10 by rotating the pair of handles 40. The spring 34 is compressed and the driving portion 26 disengages from the corresponding ratchet 328. The bobbin 20 moves on the second direction along the first groove 122 and the second groove 124 of the bracket 10.

In the illustrated embodiment, a direction of the first direction is opposite to that of the second direction.

In the illustrated embodiment, the number of the ratchets 328 is three, that is, the bobbin 20 can be located at least for three times in the cables collecting or discharging process. Therefore, the cable tidying device 100 can tidy different cables 220 having different lengths.

It saves time and labor by using the cable tidying device 100 to tidy the cables 220 having different lengths.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A cable tidying device, mounted to a cabinet to tidy cables inserted into the cabinet, comprising:
    a bracket attached to the cabinet and comprising a positioning plate, the positioning plate defining a first groove and a second groove;
    a bobbin configured to wrap the cables inserted into the cabinet, the bobbin comprising a wrapping axis, a positioning portion, and a driving portion, the wrapping axis extending through the first groove, the position portion having a positioning pole inserted into the second groove, and the driving portion extending from an end of the wrapping axis; and
    a locating member coupled to the bracket and configured to position the bobbin, comprising a spine plate, the spine plate comprising a main body and a plurality of ratchets, the plurality of ratchets being positioned on the main body at a plurality of intervals;
    wherein the wrapping axis is moved along the first groove of the bracket to disengage the corresponding ratchet from the bobbin, causing the bobbin to rotate with respect to the bracket in a first direction or a second direction opposite to the first direction to collect or release the cables;
    wherein the positioning plate further defines a positioning hole, the spine plate further comprises a protruding post, and the protruding post is positioned in the main body and passes through the positioning hole.

2. The cable tidying device as claimed in claim 1, wherein the locating member further comprises a spring and a fixing portion, the fixing portion has an end inserted into the positioning plate, the spring is located between the fixing portion and the positioning plate, and the fixing portion is configured to compress the spring to move the spine plate in a third direction perpendicular to the positioning plate and disengage the driving portion from the corresponding ratchet.

3. The cable tidying device as claimed in claim 2, wherein the bobbin further comprises a plurality of turntables, the plurality of turntables divide the wrapping axis into a plurality of concentric wrapping sections for wrapping the cables.

4. The cable tidying device as claimed in claim 1, wherein the first groove is homocentric with the second groove, and is homocentric with the positioning hole.

5. The cable tidying device as claimed in claim 1, wherein the spine plate further comprises a stopper portion extending from the main body, the stopper portion mates with a sidewall of the bracket to stop the spine plate from rotating.

6. The cable tidying device as claimed in claim 5, wherein the spine plate further comprises a limited block configured on an outside wall of the protruding post, the limited block resists on the positioning plate when the driving portioning engages with the corresponding ratchet.

7. The cable tidying device as claimed in claim 1, wherein the bracket further comprises a fixing plate, the fixing plate bends and extends from a sidewall of the positioning plate and is fixed on a sidewall of the cabinet.

8. The cable tidying device as claimed in claim 1, wherein the driving portion defines a first inclined plane and each of the plurality of ratchets defines a second inclined plane, the first inclined plane engages with the second inclined plane to drive the locating member moving in axis direction.

9. A cable tidying device, mounted to a cabinet to tidy cables inserted into the cabinet, comprising:
- a bracket attached to the cabinet and comprising a positioning plate, the positioning plate defining a first groove and a second groove;
- a bobbin configured to wrap the cables inserted into the cabinet, the bobbin comprising a wrapping axis, a positioning portion, and a driving portion, the wrapping axis extending through the bracket, the position portion having a positioning pole inserted into the second groove, and the driving portion extending from the wrapping axis; and
- a locating member coupled to the bracket, the locating member comprising a spine plate having a plurality of ratchets, the plurality of the ratchets being arranged in a predetermined manner such that one of the plurality of the ratchets is engaged with the driving portion at a time;
- wherein when the wrapping axis is driven to move from one of the plurality of the ratchets to another one of the plurality of the ratchets, the bobbin rotates with respect to the bracket to in a first direction or a second direction to wind or unwind the cable;
- wherein the positioning plate further defines a positioning hole, the spine plate further comprises a protruding post, and the protruding post is positioned in the main body and passes through the positioning hole.

10. The cable tidying device as claimed in claim 9, wherein the predetermined manner is that the plurality of the ratchets are arranged in an arc at interval.

11. The cable tidying device as claimed in claim 10, wherein the positioning plate defines a first groove, the bobbin is moved in the first groove when the bobbin is moved from one of the plurality of the ratchets to another one of the plurality of the ratchets.

12. The cable tidying device as claimed in claim 11, wherein the positioning plate further defines a positioning hole, the spine plate further comprises a protruding post, and the protruding post is positioned in the main body and passes through the positioning hole.

13. The cable tidying device as claimed in claim 12, wherein the locating member further comprises a spring and a fixing portion, the fixing portion has an end inserted into the positioning plate, the spring is located between the fixing portion and the positioning plate, and the fixing portion is forced to compress the spring to move the spine in a third direction perpendicular to the positioning plate and disengage the driving portion from the corresponding ratchet.

14. The cable tidying device as claimed in claim 13, wherein the bobbin further comprises a plurality of turntables, the plurality of turntables divide the wrapping axis into a plurality of concentric wrapping sections for wrapping the cables.

15. The cable tidying device as claimed in claim 9, wherein the spine plate further comprises a stopper portion extending from the main body, the stopper portion mates with a sidewall of the bracket to stop the spine plate from rotating.

16. The cable tidying device as claimed in claim 15, wherein the spine plate further comprises a limited block configured on an outside wall of the protruding post, the limited block resists on the positioning plate when the driving portioning engages with the corresponding ratchet.

17. The cable tidying device as claimed in claim 9, wherein the bracket further comprises a fixing plate, the fixing plate bends and extends from a sidewall of the positioning plate and is fixed on a sidewall of the cabinet.

18. The cable tidying device as claimed in claim 9, wherein the driving portion defines a first inclined plane and each of the plurality of ratchets defines a second inclined plane, the first inclined plane engages with the second inclined plane to drive the locating member moving in axis direction.

\* \* \* \* \*